United States Patent
Diwakar Abraham et al.

(10) Patent No.: US 12,175,813 B2
(45) Date of Patent: Dec. 24, 2024

(54) FAULT ISOLATION USING ON-BOARD DIAGNOSTIC (OBD) CAPABILITY DATA

(71) Applicant: Cummins Inc., Columbus, IN (US)

(72) Inventors: Jeffrey Diwakar Abraham, Columbus, IN (US); Marcela Schmalz de Bernardi, Columbus, IN (US); Avra Brahma, Fishers, IN (US); Timothy J. Greis, Columbus, IN (US); Michael Haas, Columbus, IN (US); Gregory H. Henderson, Columbus, IN (US); Adam W. Kidd, Indianapolis, IN (US); Lyle E. Kocher, Whiteland, IN (US); Krithika Mohan, Columbus, IN (US); Daniel J. Smith, Columbus, IN (US); Christophe Tricaud, Columbus, IN (US); Ananth Vemuri, Columbus, IN (US); Easwar Yarrabikki, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/371,183

(22) Filed: Sep. 21, 2023

(65) Prior Publication Data

US 2024/0013594 A1   Jan. 11, 2024

Related U.S. Application Data

(63) Continuation of application No. 17/247,383, filed on Dec. 9, 2020, now Pat. No. 11,798,325.

(51) Int. Cl.
    *G07C 5/08*    (2006.01)
    *B60R 16/023*  (2006.01)
    (Continued)

(52) U.S. Cl.
    CPC ........ *G07C 5/0808* (2013.01); *B60R 16/0234* (2013.01); *F02B 37/24* (2013.01);
    (Continued)

(58) Field of Classification Search
    CPC .... G07C 5/0808; G07C 5/008; G07C 5/0816; G07C 5/085; B60R 16/0234; F02B 37/24;
    (Continued)

(56) References Cited

U.S. PATENT DOCUMENTS 6,529,808 B1   3/2003  Diem
6,687,585 B1   2/2004  Rizzoni et al.
(Continued)

FOREIGN PATENT DOCUMENTS

CN   101260851 B  * 11/2011 ......... B01D 46/0086
CN   106843197 A    6/2017
(Continued)

OTHER PUBLICATIONS

DE112012003853T5 (Worden et al.) (Jul. 17, 2014) (Machine Translation) (Year: 2014).*
(Continued)

*Primary Examiner* — Mahmoud Gimie
(74) *Attorney, Agent, or Firm* — Foley & Lardner LLP

(57) ABSTRACT

A system is configured to store a relationship data set of a plurality of diagnostic estimators and a plurality of failure modes, each failure mode represents a type of failure that can occur with a sensor or a vehicle component of a vehicle system, each diagnostic estimator is associated with a respective subset of the failure modes, each subset defines a control space within the vehicle system that contains at least one of (i) one or more sensors or (ii) one or more vehicle components. The system is configured to store a healthy diagnostic vector regarding nominal operational parameters of the vehicle system; acquire diagnostic information (Continued)

regarding current operational parameters of the vehicle system to generate an error diagnostic vector; apply the error diagnostic vector to the healthy diagnostic vector to generate a ratio diagnostic vector; and apply the ratio diagnostic vector to generate a value for each failure mode.

20 Claims, 9 Drawing Sheets

(51) Int. Cl.
    *F02B 37/24*     (2006.01)
    *F02M 26/02*     (2016.01)
    *F02M 35/10*     (2006.01)
    *G07C 5/00*     (2006.01)

(52) U.S. Cl.
    CPC ...... *F02M 26/02* (2016.02); *F02M 35/10222* (2013.01); *G07C 5/008* (2013.01); *G07C 5/0816* (2013.01); *G07C 5/085* (2013.01)

(58) Field of Classification Search
    CPC ... F02M 26/02; F02M 35/10222; Y02T 10/12
    USPC ........................................................ 701/30.2
    See application file for complete search history.

(56) References Cited

U.S. PATENT DOCUMENTS

| | | | |
|---|---|---|---|
| 6,766,230 B1 | 7/2004 | Rizzoni et al. | |
| 7,519,604 B2 | 4/2009 | Gomes et al. | |
| 7,603,293 B2 | 10/2009 | Chenn | |
| 8,019,501 B2 | 9/2011 | Breed | |
| 8,024,084 B2 | 9/2011 | Breed | |
| 8,055,400 B2 | 11/2011 | Grenn | |
| 8,301,333 B2 | 10/2012 | Singh et al. | |
| 8,433,472 B2 | 4/2013 | Singh et al. | |
| 8,498,776 B2 | 7/2013 | Singh et al. | |
| 8,600,605 B2 | 12/2013 | Grenn et al. | |
| 8,897,953 B2 | 11/2014 | Olsen et al. | |
| 8,996,235 B2 | 3/2015 | Singh et al. | |
| 9,384,453 B2 | 7/2016 | Weaks | |
| 9,514,580 B2 | 12/2016 | Collins et al. | |
| 10,049,510 B2 | 8/2018 | Nyalamadugu et al. | |
| 10,055,906 B1 | 8/2018 | Fournier et al. | |
| 2009/0295559 A1 | 12/2009 | Howell et al. | |
| 2012/0167665 A1* | 7/2012 | Garimella | G05B 23/0221 |
| | | | 73/23.31 |
| 2015/0228127 A1 | 8/2015 | Ross | |
| 2017/0024943 A1 | 1/2017 | Wodecki et al. | |
| 2018/0174373 A1 | 6/2018 | Hansen et al. | |
| 2018/0257663 A1 | 9/2018 | Jiang et al. | |
| 2019/0195097 A1 | 6/2019 | Zhang et al. | |

FOREIGN PATENT DOCUMENTS

| | | | | |
|---|---|---|---|---|
| DE | 112012003853 T5 | * | 7/2014 | ............. F01M 11/10 |
| FR | 3021356 A1 | * | 11/2015 | ............. F01N 11/00 |
| WO | WO-2018/204253 | | 11/2018 | |
| WO | WO-2018218124 A1 | * | 11/2018 | ............. F02D 41/22 |

OTHER PUBLICATIONS

CN 101260851B (Benscote et al.) (Nov. 23, 2011) (Machine Translation) (Year: 2011).

Non-Final Office Action on U.S. Appl. No. 17/247,383 Dtd Feb. 24, 2023.

Notice of Allowance on U.S. Appl. No. 17/247,383 Dtd Jun. 22, 2023.

\* cited by examiner

FAULT ISOLATION USING ON-BOARD DIAGNOSTIC (OBD) CAPABILITY DATA

CROSS-REFERENCE TO RELATED PATENT APPLICATION

This application is a continuation of U.S. patent application Ser. No. 17/247,383, filed Dec. 9, 2020, which is incorporated herein by reference in its entirety.

BACKGROUND

On-board diagnostic (OBD) capability data is the data that diagnostic monitors use to make decisions on whether a respective vehicle system is healthy or failed. For a healthy system, the capability data is positioned far away from a diagnostic threshold. Many diagnostics monitors are designed to identify a failure in the system. However, a failure mode may result in multiple diagnostics monitors that trigger a fault, but not necessarily that point to the failure mode causing the performance loss. Specifically, today, fault codes are typically broad, system-level fault codes. System-level fault codes are only able to alert drivers and technicians to an issue at a high-level, like the air handling system. However, dozens of parts affect air handling. Many trucks enter the repair bay with only system-level faults, requiring a separate fault isolation mechanism for service technicians to efficiently identify the failure mode and replace or otherwise service a specific part.

SUMMARY

One embodiment relates to a system. The system includes one or more processing circuits comprising one or more memory devices coupled to one or more processors. The one or more memory devices are configured to store instructions thereon that, when executed by the one or more processors, cause the one or more processors to store a fault isolation table including a relationship matrix of a plurality of diagnostic estimators and a plurality of failure modes, each of the plurality of failure modes represents a type of failure that can occur with (i) a sensor or (ii) a vehicle component of a vehicle system that is associated with the fault isolation table, each of the plurality of diagnostic estimators is associated with a respective subset of the plurality of failure modes, each respective subset defines a control volume within the vehicle system that contains at least one of (i) one or more sensors or (ii) one or more vehicle components of the vehicle system; store a healthy diagnostic vector regarding nominal operational parameters of the vehicle system when healthy; acquire diagnostic information regarding current operational parameters of the vehicle system; generate an error diagnostic vector based on the diagnostic information; divide the error diagnostic vector by the healthy diagnostic vector to generate a ratio diagnostic vector; multiply the ratio diagnostic vector with the relationship matrix to generate a value for each of the plurality of failure modes; and sort the plurality of failure modes based on the value for each of the plurality of failure modes to facilitate identifying which of the plurality of failure modes are most likely to cause a fault within the vehicle system.

Another embodiment relates to a system. The system includes one or more processing circuits comprising one or more memory devices coupled to one or more processors. The one or more memory devices are configured to store instructions thereon that, when executed by the one or more processors, cause the one or more processors to acquire OBD capability data from a plurality of OBD monitors associated with a vehicle system, where the OBD capability data includes at least (i) first OBD capability data acquired from a first OBD monitor associated with a first plurality of components or a first portion of the vehicle system, (ii) second OBD capability data acquired from a second OBD monitor associated with a second plurality of components or a second portion of the vehicle system, and (iii) third OBD capability data acquired from a third OBD monitor associated with a third plurality of components or a third portion of the vehicle system, where (i) the first plurality of components and the second plurality of components include a first common component or (ii) the first portion and the second portion at least partially overlap, and where (i) the first plurality of components and the third plurality of components include a second common component or (ii) the first portion and the third portion at least partially overlap; compare the first OBD capability data, the second OBD capability data, and the third OBD capability data; and identify a faulty component or a faulty portion of the vehicle system based on the comparison.

Still another embodiment relates to a system. The system includes one or more processing circuits including one or more memory devices coupled to one or more processors. The one or more memory devices are configured to store instructions thereon that, when executed by the one or more processors, cause the one or more processors to acquire data regarding current operating parameters of at least one of a vehicle system of a vehicle or a component of the vehicle system; monitor the current operating parameters of the at least one of the system or the component over an operational life of the at least one of the vehicle system or the component; compare the current operating parameters of the at least one of the system or the component to at least one of: (i) nominal operating parameters from when the at least one of the vehicle system or the component was new, (ii) current operating parameters of at least one of a similar system or a similar component of the vehicle, or (iii) operating parameters of the at least one of the similar system or the similar component of one or more other vehicles; and provide an alert in response to the comparison indicating that the at least one of the vehicle system the component requires maintenance or replacement.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for fault isolation using operation data and/or OBD capability data. The various concepts introduced above and discussed in greater detail below may be implemented in any number of ways, as the concepts described are not limited to any particular manner of implementation. Examples of specific implementations and applications are provided primarily for illustrative purposes.

Figure 1:
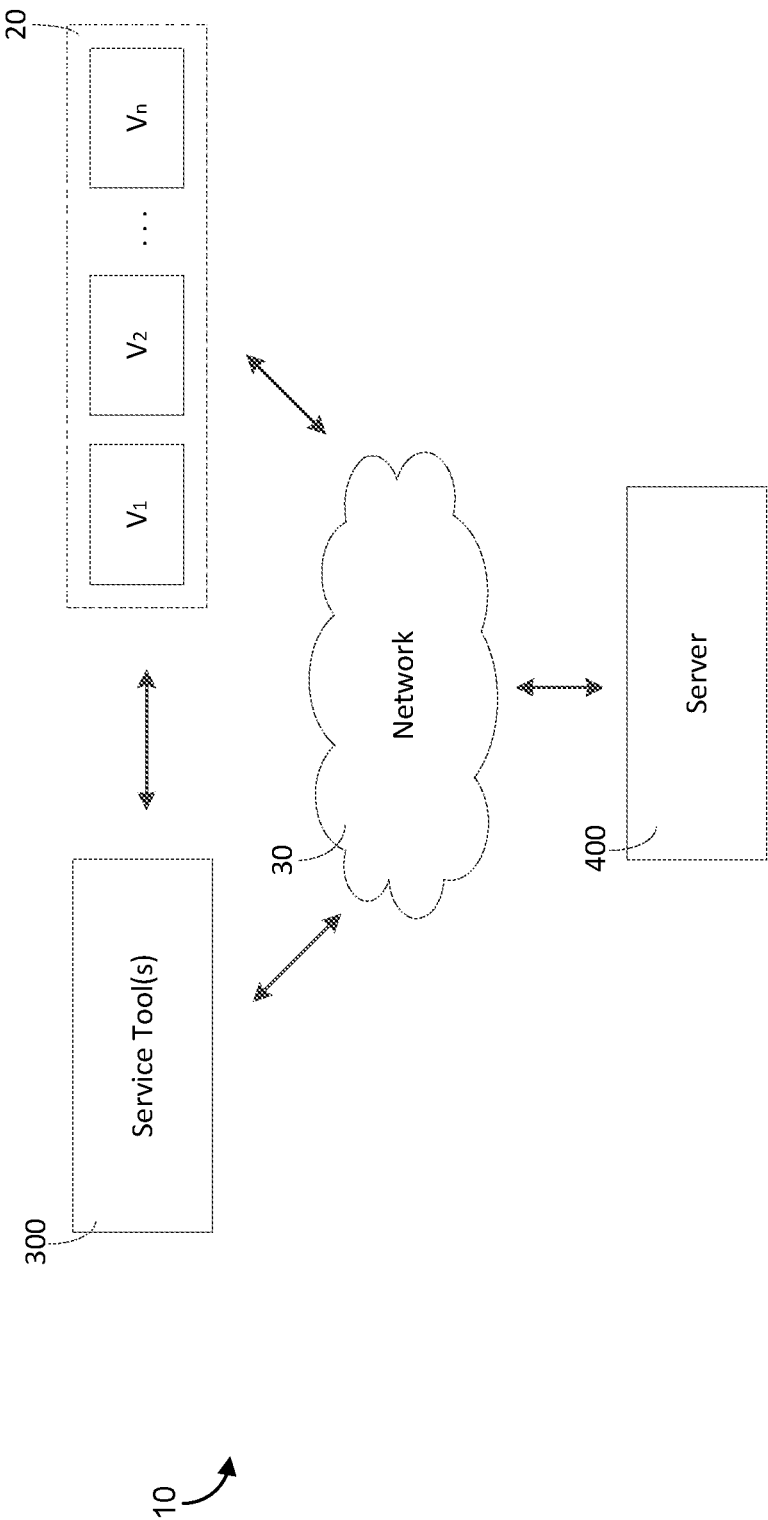
FIG. 1 is a schematic diagram of a vehicle diagnostics system, according to an example embodiment.

As shown in FIG. 1, a vehicle control system 10 includes one or more vehicles 20, a network 30, one or more service tools 300, and a server 400. According to an example embodiment, the network 30 communicably couples the server 400 to the vehicles 20 (e.g., wirelessly, etc.) and the service tool 300 (e.g., wirelessly, via a wired connection, etc.). The service tool 300 may be a diagnostics tool used by a technician or service person to diagnose faults of the vehicle 20 within a service bay or similar circumstance (e.g., light and heavy duty scan tools, code readers, etc.). The server 400 may be a remote server that compiles data from a plurality of the vehicles 20. The server 400 may be structured to facilitate comparing the data between various similar vehicles to assist in the fault detection and/or fault isolation processes described herein. While the disclosure herein focuses on and references vehicles and vehicle control systems, it should be understood that the capabilities of the vehicle control system 10 disclosed herein may similar be applied to non-vehicle based applications such as power generation systems (e.g., standby generator systems, portable generator system, etc.), battery systems, fuel cell systems, and the like.

Figure 2:
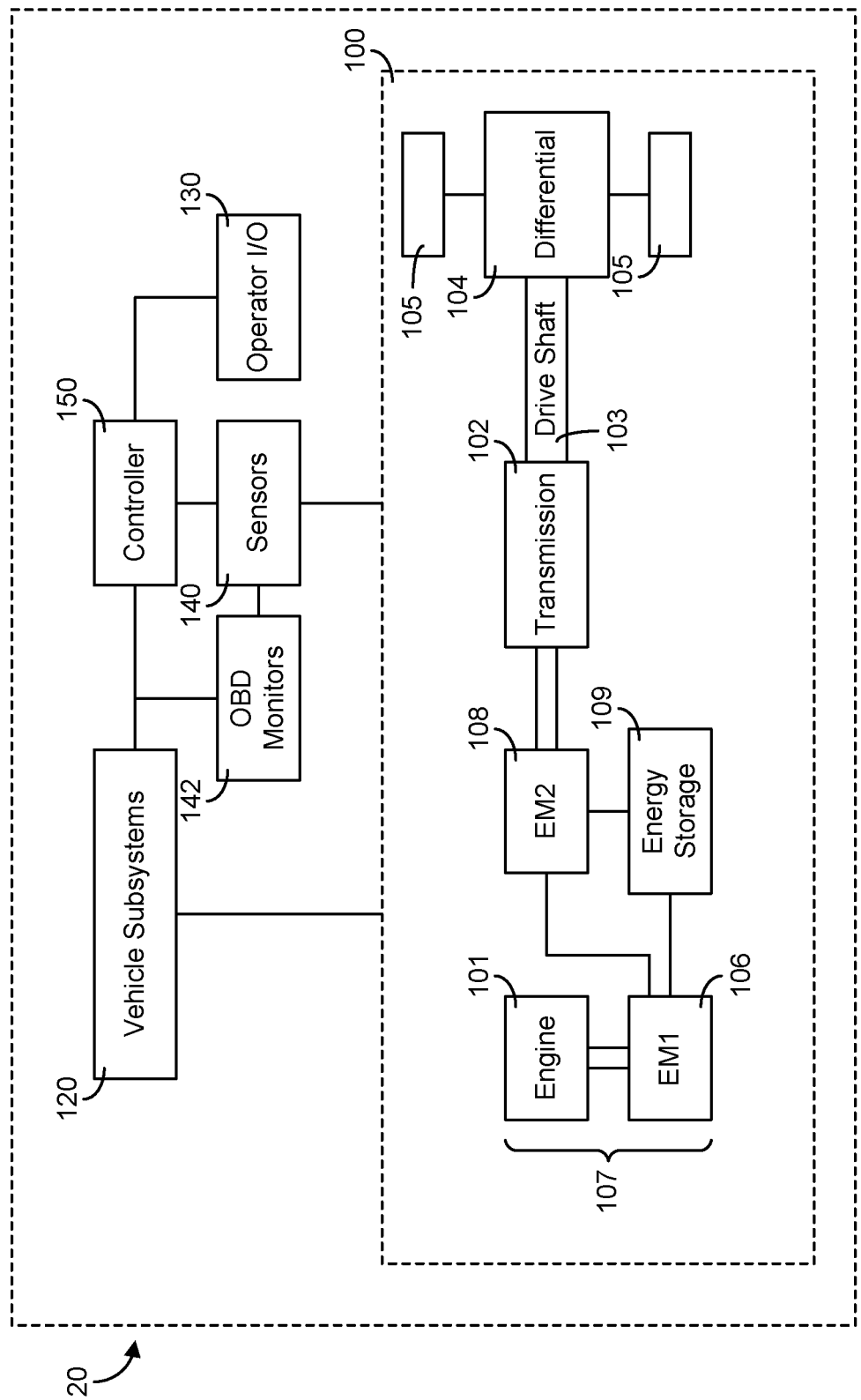
FIG. 2 is a schematic diagram of a vehicle having a series hybrid powertrain and a controller used with the vehicle diagnostics system of FIG. 1, according to an example embodiment.
Figure 3:
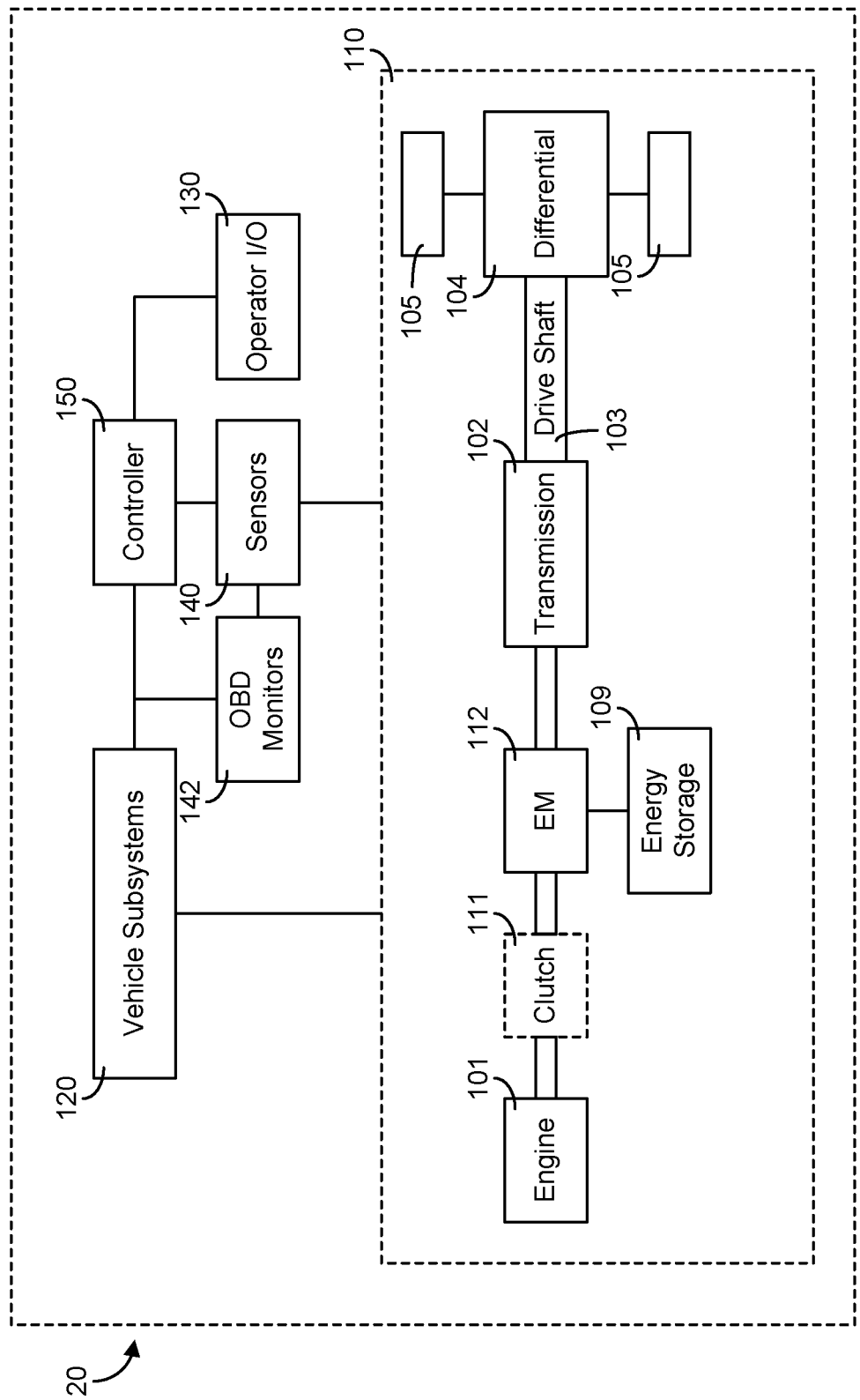
FIG. 3 is a schematic diagram of a vehicle having a parallel hybrid powertrain and a controller used with the vehicle diagnostics system of FIG. 1, according to an example embodiment.
Figure 4:
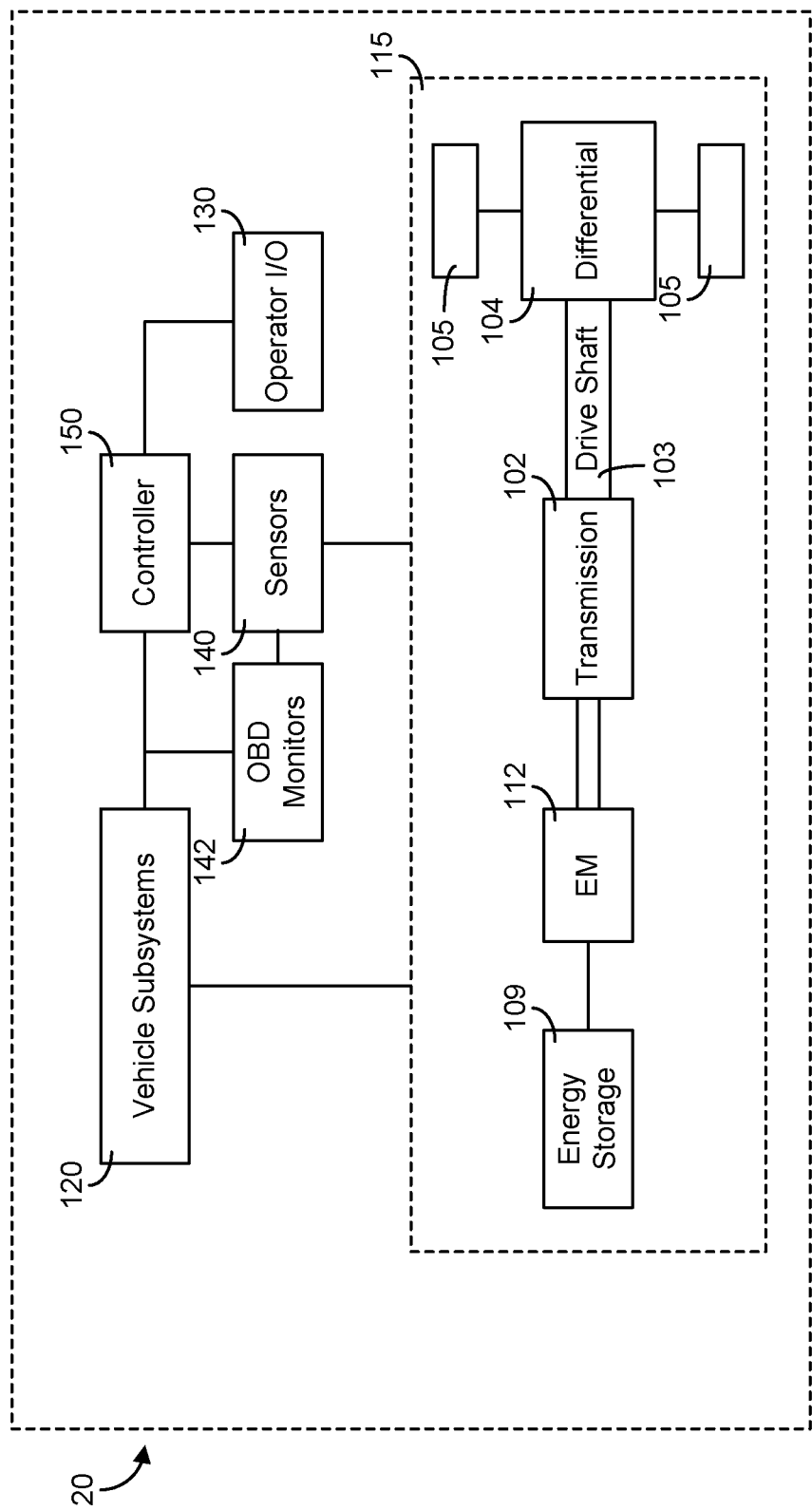
FIG. 4 is a schematic diagram of a vehicle having a full electric powertrain and a controller used with the vehicle diagnostics system of FIG. 1, according to an example embodiment.
Figure 5:
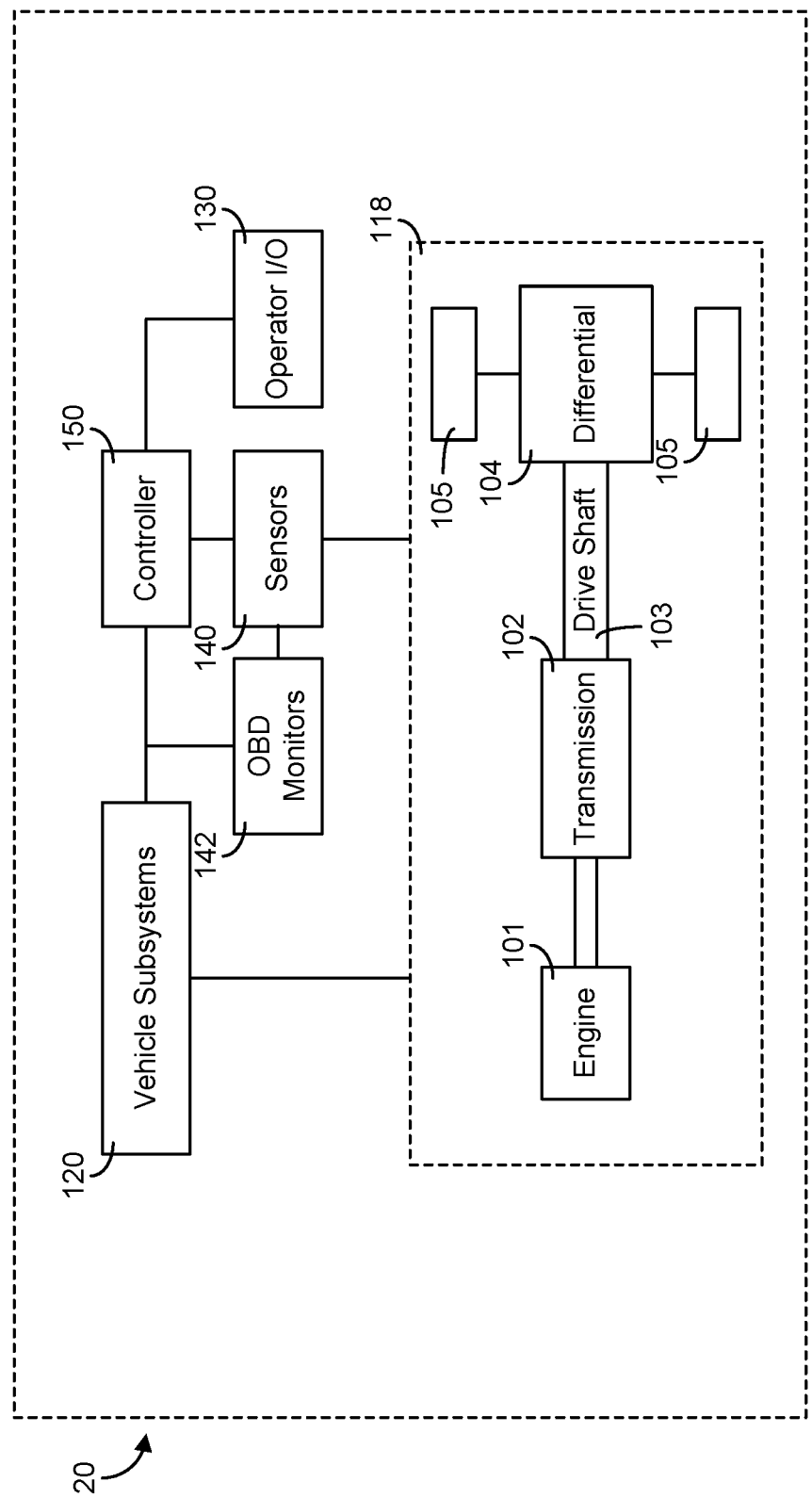
FIG. 5 is a schematic diagram of a vehicle having an internal combustion engine driven powertrain and a controller used with the vehicle diagnostics system of FIG. 1, according to an example embodiment.

Referring now to FIGS. 2-5, schematic diagrams of the vehicle 20 are shown according to various example embodiments. As shown in FIG. 2, the vehicle 20 includes a powertrain 100, vehicle subsystems 120, an operator input/output (I/O) device 130, sensors 140 communicably coupled to one or more components of the vehicle 20, OBD monitors 142 communicably coupled to the sensors 140, and a vehicle controller 150. As shown in FIG. 3, the vehicle 20 includes a powertrain 110 in place of the powertrain 100 of FIG. 2. As shown in FIG. 4, the vehicle 20 includes a powertrain 115 in place of the powertrain 100 of FIG. 2 and the powertrain 110 of FIG. 3. As shown in FIG. 5, the vehicle 20 includes a powertrain 118 in place of the powertrain 100 of FIG. 2, the powertrain 110 of FIG. 3, and the powertrain 115 of FIG. 4. These components are described in greater detail herein.

According to the example embodiment shown in FIG. 2, the powertrain 100 of the vehicle 20 is structured as a series hybrid powertrain. According to the example embodiment shown in FIG. 3, the powertrain 110 of the vehicle 20 is structured as a parallel hybrid powertrain. In some embodiments, the powertrain 100 and/or the powertrain 110 of the vehicle 20 are structured as another type of hybrid powertrain. According to the example embodiment shown in FIG. 4, the powertrain 115 of the vehicle 20 is structured as a full electric powertrain. According to the example embodiment shown in FIG. 5, the powertrain 118 is structured as a conventional, non-hybrid, non-electric powertrain (i.e., an internal combustion engine driven powertrain). The vehicle 20 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, fire trucks, concrete trucks, delivery trucks, and any other type of vehicle. Thus, the present disclosure is applicable with a wide variety of implementations.

Components of the vehicle 20 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the vehicle controller 150 is communicably coupled to the systems and components in the vehicle 20, the vehicle controller 150 is structured to acquire operation data and/or OBD capability data regarding one or more of the components or systems shown in FIGS. 2-5. For example, the operation data may include data regarding operating conditions of the powertrain 100, the powertrain 110, the powertrain 115, the powertrain 118, the vehicle subsystems 120, and/or other components (e.g., a battery system, a motor, a generator, a regenerative braking system, an engine, an exhaust aftertreatment system, an air handling system, etc.) acquired by one or more sensors, such as sensors 140. As another example, the OBD capability data may be values indicative of the health of a component, subsystem, or system of the vehicle 20 determined by the OBD monitors 142 based on the operation data acquired by the sensors 140. The vehicle controller 150 may detect faults within the vehicle 20 and isolate the faults to a respective system of the vehicle 20 and to specific components within the respective system based on the operation data and/or the OBD capability data. Further, it should be understood that any of the fault detection and fault isolation capabilities of the vehicle controller 150 described herein can be similarly performed by or with the service tool 300 and/or the server 400, or in various combinations between the vehicle controller 150, the service tool 300, and/or the server 400.

As shown in FIG. 2, the powertrain 100 (e.g., a series hybrid powertrain, etc.) includes an engine 101, a transmission 102, a driveshaft 103, a differential 104, a final drive 105, a first electromagnetic device 106 (e.g., a generator, a motor-generator, etc.), a second electromagnetic device 108 (e.g., a motor, a motor-generator, etc.), and an energy storage device 109. The engine 101 may be structured as any engine type, including a spark-ignition internal combustion engine, a compression-ignition internal combustion engine, and/or a fuel cell, among other alternatives. The engine 101 may be powered by any fuel type (e.g., diesel, ethanol, gasoline, natural gas, propane, hydrogen, etc.). Similarly, the transmission 102 may be structured as any type of transmission, such as a continuous variable transmission, a manual transmission, an automatic transmission, an automatic-manual transmission, a dual clutch transmission, and so on.

Accordingly, as transmissions vary from geared to continuous configurations (e.g., continuous variable transmission), the transmission 102 may include a variety of settings (gears, for a geared transmission) that affect different output speeds based on an input speed received thereby (e.g., from the second electromagnetic device 108, etc.). Like the engine 101 and the transmission 102, the driveshaft 103, the differential 104, and/or the final drive 105 may be structured in any configuration dependent on the application (e.g., the final drive 105 is structured as wheels in an automotive application and a propeller in a boat application, etc.). Further, the driveshaft 103 may be structured as any type of driveshaft including, but not limited to, a one-piece, two-piece, and a slip-in-tube driveshaft based on the application.

As shown in FIG. 2, the engine 101 and the first electromagnetic device 106 are mechanically coupled together (e.g., via a shaft, a gear box, etc.) to form a genset 107. In some embodiments, the first electromagnetic device 106 is a single device having both generating and motoring capabilities. In some embodiments, the first electromagnetic device 106 has only generating capabilities. According to an example embodiment, the engine 101 is structured to drive the first electromagnetic device 106 to generate electrical energy. As shown in FIG. 2, the first electromagnetic device 106 is electrically coupled to the energy storage device 109 such that the first electromagnetic device 106 may provide energy generated thereby to the energy storage device 109 for storage. In some embodiments, the first electromagnetic device 106 is structured to receive stored electrical energy from the energy storage device 109 to facilitate operation thereof. By way of example, the first electromagnetic device 106 may receive stored electrical energy from the energy storage device 109 to facilitate starting the engine 101.

As shown in FIG. 2, the second electromagnetic device 108 is mechanically coupled to the transmission 102 (e.g., via a shaft, a gear box, etc.). In an alternative embodiment, the powertrain 100 does not include the transmission 102 and the second electromagnetic device 108 is directly coupled to the driveshaft 103 or the differential 104. In some embodiments, the second electromagnetic device 108 is a single device having both generating and motoring capabilities. In some embodiments, the second electromagnetic device 108 has only motoring capabilities. As shown in FIG. 2, the second electromagnetic device 108 is electrically coupled to the first electromagnetic device 106 and the energy storage device 109 such that the second electromagnetic device 108 may receive energy stored by the energy storage device 109 and/or generated by the first electromagnetic device 106 to facilitate operation thereof. By way of example, the second electromagnetic device 108 may receive stored electrical energy from the energy storage device 109 and/or generated electrical energy from the first electromagnetic device 106 to facilitate providing a mechanical output to the transmission 102. In some embodiments, the second electromagnetic device 108 is structured to generate electrical energy for storage in the energy storage device 109. By way of example, the second electromagnetic device 108 may be structured to utilize a negative torque supply to perform energy regeneration (e.g., when the torque demand therefrom is zero, during engine braking, while the vehicle 20 is coasting down a hill, etc.).

According to an example embodiment, the energy storage device 109 includes one or more batteries (e.g., high voltage batteries, a lead-acid batteries, a lithium-ion batteries, lithium iron phosphate batteries, etc.), one or more capacitors (e.g., super capacitors, etc.), and/or any other energy storage devices, or combination thereof. As shown in FIG. 2, the energy storage device 109 is electrically coupled to the first electromagnetic device 106 and the second electromagnetic device 108. In some embodiments, the energy storage device 109, the first electromagnetic device 106, and/or the second electromagnetic device 108 are electrically coupled to one or more of the vehicle subsystems 120 (e.g., a regenerative braking system, electrically-powered vehicle accessories, etc.). According to an example embodiment, the energy storage device 109 is structured to store electrical energy (i) received from a charging station (e.g., a vehicle charging station, etc.), (ii) generated by the first electromagnetic device 106, (iii) generated by the second electromagnetic device 108, and/or (iv) generated by a regenerative braking system. The energy storage device 109 may be structured to provide the stored electrical energy to (i) the vehicle subsystems 120 to operate various electrical based components of the vehicle 20 (e.g., while the engine 101 is running, while the engine 101 is off, etc.), (ii) the first electromagnetic device 106 to start the engine 101 (e.g., in response to a restart command after a stop-start feature turns off the engine 101, when an operator keys on the engine 101, etc.), and/or (iii) the second electromagnetic device 108 to facilitate providing a mechanical output to the transmission 102 (e.g., to drive the vehicle 20, etc.).

As shown in FIG. 3, the powertrain 110 (e.g., a parallel hybrid powertrain, etc.) includes the engine 101, the transmission 102, the driveshaft 103, the differential 104, the final drive 105, the energy storage device 109, and an electromagnetic device 112 (e.g., a motor-generator, etc.). The powertrain 110 optionally includes a clutch 111 positioned between the engine 101 and the electromagnetic device 112. The clutch 111 is structured to facilitate selectively decoupling the engine 101 from the electromagnetic device 112. In some embodiments, the powertrain 100 of FIG. 2 includes a clutch positioned to selectively mechanically couple the first electromagnetic device 106 with the second electromagnetic device 108 and/or the transmission 102. In such an embodiment, the powertrain 100 having a clutch may be selectively reconfigurable between a series hybrid powertrain and a parallel hybrid powertrain.

As shown in FIG. 3, the engine 101 and the electromagnetic device 112 are mechanically coupled together (e.g., via a shaft, a gear box, the clutch 111, etc.). In some embodiments, the electromagnetic device 112 is a single device having both generating and motoring capabilities. According to an example embodiment, the engine 101 is structured to drive the electromagnetic device 112 to generate electrical energy. As shown in FIG. 2, the electromagnetic device 112 is electrically coupled to the energy storage device 109 such that the electromagnetic device 112 may provide energy generated thereby to the energy storage device 109 for storage. In some embodiments, the electromagnetic device 112 is structured to receive stored electrical energy from the energy storage device 109 to facilitate operation thereof. By way of example, the electromagnetic device 112 may receive stored electrical energy from the energy storage device 109 to facilitate starting the engine 101.

As shown in FIG. 3, the electromagnetic device 112 is mechanically coupled to the transmission 102 (e.g., via a shaft, a gear box, etc.). In an alternative embodiment, the powertrain 110 does not include the transmission 102 and the electromagnetic device 112 is directly coupled to the driveshaft 103 or the differential 104. The electromagnetic device 112 may receive energy stored by the energy storage device 109 and/or mechanical energy from the engine 101 to facilitate providing a mechanical output to the transmission 102. In some embodiments, the electromagnetic device 112 is structured to generate electrical energy for storage in the energy storage device 109 in response to receiving a mechanical input from the transmission 102. By way of example, the electromagnetic device 112 may be structured to utilize a negative torque supply to perform energy regeneration (e.g., when the torque demand therefrom is zero, during engine braking, while the vehicle 20 is coasting down a hill, etc.).

As shown in FIG. 3, the energy storage device 109 is electrically coupled to the electromagnetic device 112. In some embodiments, the energy storage device 109 and/or the electromagnetic device 112 are electrically coupled to one or more of the vehicle subsystems 120 (e.g., a regenerative braking system, electrically-powered vehicle accessories, etc.). According to an example embodiment, the energy storage device 109 is structured to store electrical energy (i) received from a charging station (e.g., a vehicle charging station, etc.), (ii) generated by the electromagnetic device 112, and/or (iii) generated by a regenerative braking system. The energy storage device 109 may be structured to provide the stored electrical energy to (i) the vehicle subsystems 120 to operate various electrical based components of the vehicle 20 (e.g., while the engine 101 is running, while the engine 101 is off, etc.), (ii) the electromagnetic device 112 to start the engine 101 (e.g., in response to a restart command after a stop-start feature turns off the engine 101, when an operator keys on the engine 101, etc.), and/or (iii) the electromagnetic device 112 to facilitate providing a mechanical output to the transmission 102 (e.g., to drive the vehicle 20, etc.).

As shown in FIG. 4, the powertrain 115 (e.g., a full electric powertrain, etc.) includes the transmission 102, the driveshaft 103, the differential 104, the final drive 105, the energy storage device 109, and the electromagnetic device 112. In some embodiments, the powertrain 115 does not include the transmission 102. As shown in FIG. 5, the powertrain 118 (e.g., an internal combustion engine driven powertrain, etc.) includes the engine 101, the transmission 102, the driveshaft 103, the differential 104, the final drive 105.

In the powertrain 118, the engine 101 receives a chemical energy input (e.g., a fuel such as gasoline, diesel, etc.) and combusts the fuel to generate mechanical energy, in the form of a rotating crankshaft. The transmission 102 receives the rotating crankshaft and manipulates the speed of the crankshaft (e.g., the engine revolutions-per-minute (RPM), etc.) to affect a desired driveshaft and final drive speed. The rotating driveshaft 103 is received by the differential 104, which provides the rotation energy of the driveshaft 103 to the final drive 105. The final drive 105 then propels or moves the vehicle 20.

Referring again to FIGS. 2-5, the vehicle 20 includes the vehicle subsystems 120. In some embodiments, the vehicle subsystems 120 may include a regenerative braking system. The regenerative braking system may include various components structured to generate electricity from vehicle braking events to be stored by the energy storage device 109 for future use (e.g., by the first electromagnetic device 106, by the second electromagnetic device 108, by the electromagnetic device 112, by the electrical vehicle components, etc.). The vehicle subsystems 120 may include other components including mechanically driven or electrically driven vehicle components (e.g., HVAC system, lights, pumps, fans, etc.). The vehicle subsystems 120 may also include an exhaust aftertreatment system having components used to reduce exhaust emissions, such as a selective catalytic reduction (SCR) catalyst, a diesel oxidation catalyst (DOC), a diesel particulate filter (DPF), a diesel exhaust fluid (DEF) doser with a supply of diesel exhaust fluid, a plurality of sensors for monitoring the aftertreatment system (e.g., a nitrogen oxide (NOx) sensor, temperature sensors, etc.), and/or still other components. The vehicle subsystems 120 may also include an air handling system having various components to provide air to the engine 101 and cooling systems (e.g., air intakes, air filters, intercoolers, exhaust gas recirculation (EGR) components, etc.).

The vehicle subsystems 120 may include one or more electrically-powered accessories and/or engine-drive accessories. Electrically-powered accessories may receive power from the energy storage device 109, the first electromagnetic device 106, the second electromagnetic device 108, and/or the electromagnetic device 112 to facilitate operation thereof. Being electrically-powered, the electrically-powered accessories may be able to be driven largely independent of the engine 101 of the vehicle 20 (e.g., not driven off of a belt coupled to the engine 101). The electrically-powered accessories may include, but are not limited to, air compressors (e.g., for pneumatic devices, etc.), air conditioning systems, power steering pumps, engine coolant pumps, fans, and/or any other electrically-powered vehicle accessories.

The operator I/O device 130 may enable an operator of the vehicle 20 (or passenger) to communicate with the vehicle 20 and the vehicle controller 150. By way of example, the operator I/O device 130 may include, but is not limited to, an interactive display, a touchscreen device, one or more buttons and switches, voice command receivers, and the like. In one embodiment, the operator I/O device 130 includes a brake pedal or a brake lever, an accelerator pedal, and/or an accelerator throttle.

The sensors 140 may include sensors positioned and structured to monitor operating characteristics or parameters of various systems and components of the vehicle 20 to facilitate acquiring operation data regarding the operation of the various systems and components of the vehicle 20. By way of example, the sensors 140 may include various sensors positioned throughout the vehicle 20 and the vehicle subsystems 120 thereof to measure fluid pressures (e.g., air pressures, exhaust pressures, oil pressures, coolant pressures, fuel pressures, etc.), fluid temperatures (e.g., air temperatures, exhaust temperatures, oil temperatures, etc.), component temperatures (e.g., of exhaust catalysts, of a SCR catalyst, of a DOC, of a battery, of an engine, etc.), fluid flow rates (e.g., engine mass air flow, EGR mass air flow, etc.), chemical compositions (e.g., of exhaust gases, NOx, etc.), fluid volumes (e.g., fuel, oil, coolant, etc.), speeds, (e.g., engine RPM, turbo shaft speed, etc.), valve positions (e.g., EGR valve position, engine valve positions, etc.), and/or other sensors positioned and/or structured to facilitate monitoring the operating parameters of the vehicle 20 and the systems thereof (e.g., of the powertrain, air handling system, EGR system, exhaust aftertreatment system, etc.).

The OBD monitors 142 may be variously positioned about the vehicle 20 and structured to detect faults that may be present in the vehicle 20 and the vehicle subsystems 120 thereof. To perform such fault detection, each respective OBD monitor 142 is structured to acquire operation data from a subset of the sensors 140 associated with a set of respective vehicle subsystems 120, a respective vehicle subsystem 120, or a portion of the respective subsystem 120 that the respective OBD monitor 142 is responsible for monitoring. The respective OBD monitor 142 compiles various performance parameters based on the operation data received from the subset of the sensors 140 and determines a signal value or the OBD capability data for the set of respective vehicle subsystems 120, the respective vehicle subsystem 120, or the portion of the respective subsystem 120 that the respective OBD monitor 142 is responsible for monitoring. The respective OBD monitor 142 is then structured to compare the OBD capability data against a threshold to determine whether the set of respective vehicle subsystems 120, the respective vehicle subsystem 120, or portion of the respective vehicle subsystem 120 is (i) healthy or (ii) unhealthy and trigger a fault. In some embodiments, one or more of the functions of the OBD monitors 142 described herein are performed by the vehicle controller 150 (e.g., the vehicle controller 150 receives the OBD capability data from the OBD monitors 142 and makes the healthy/unhealthy decision, the vehicle controller 150 receives the operation data and performs the functions of the OBD monitors 142, etc.).

As the components of FIGS. 2-5 are shown to be embodied in the vehicle 20, the vehicle controller 150 may be structured as one or more electronic control units (ECUs). As such, the vehicle controller 150 may be separate from or included with at least one of a transmission control unit, an exhaust aftertreatment control unit, a powertrain control module, an engine control module, etc. The function and structure of the vehicle controller 150 is described in greater detail with regards to FIG. 6.

Figure 6:
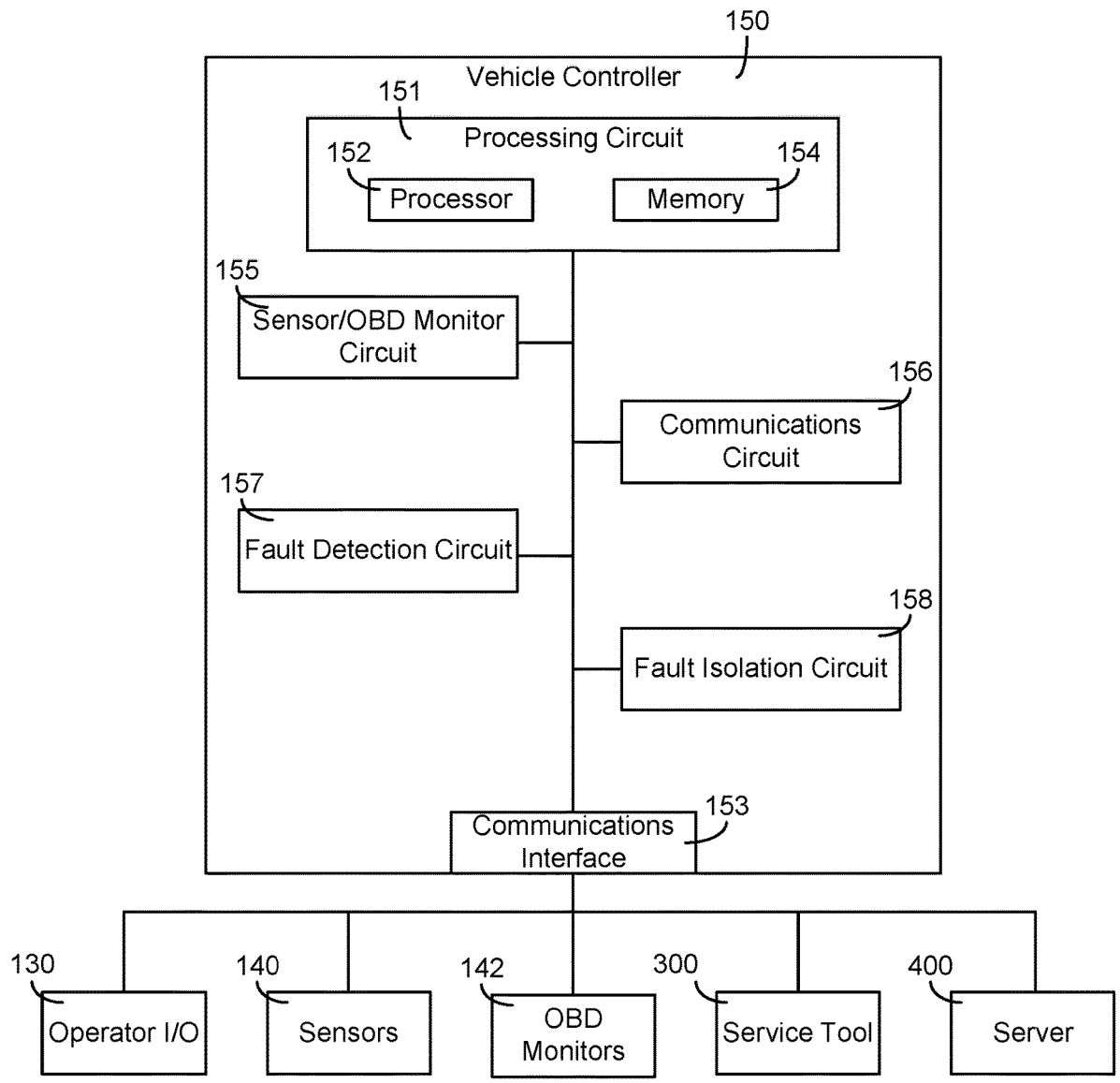
FIG. 6 is a schematic diagram of a controller included with the vehicles of FIGS. 2-5, according to an example embodiment.

Referring now to FIG. 6, a schematic diagram of the vehicle controller 150 of the vehicle 20 of FIGS. 1-5 is shown according to an example embodiment. As shown in FIG. 6, the vehicle controller 150 includes a processing circuit 151 having a processor 152 and a memory 154; a communications interface 153; a sensor/OBD monitor circuit 155; a communications circuit 156; a fault detection circuit 157; and a fault isolation circuit 158. While not show, it should be understood that the service tool 300 and/or the server 400 can include components similar to the communications circuit 156, the fault detection circuit 157, and/or the fault isolation circuit 158 such that the functions and/or processes performed thereby and as described herein can similarly be performed by the service tool 300 and/or the server 400, alone or in combination with the vehicle controller 150.

In one configuration, the sensor/OBD monitor circuit 155, the communications circuit 156, the fault detection circuit 157, and/or the fault isolation circuit 158 are embodied as machine or computer-readable media storing instructions that is executable by a processor, such as the processor 152. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the sensor/OBD monitor circuit 155, the communications circuit 156, the fault detection circuit 157, and/or the fault isolation circuit 158 are embodied as hardware units, such as electronic control units. As such, the sensor/OBD monitor circuit 155, the communications circuit 156, the fault detection circuit 157, and/or the fault isolation circuit 158 may be embodied as one or more circuitry components including, but not limited to, processing circuitry, network interfaces, peripheral devices, input devices, output devices, sensors, etc. In some embodiments, the sensor/OBD monitor circuit 155, the communications circuit 156, the fault detection circuit 157, and/or the fault isolation circuit 158 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the sensor/OBD monitor circuit 155, the communications circuit 156, the fault detection circuit 157, and/or the fault isolation circuit 158 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. Thus, the sensor/OBD monitor circuit 155, the communications circuit 156, the fault detection circuit 157, and/or the fault isolation circuit 158 may also include programmable hardware devices such as field programmable gate arrays, programmable array logic, programmable logic devices or the like. In this regard, the sensor/OBD monitor circuit 155, the communications circuit 156, the fault detection circuit 157, and/or the fault isolation circuit 158 may include one or more memory devices for storing instructions that are executable by the processor(s) of the sensor/OBD monitor circuit 155, the communications circuit 156, the fault detection circuit 157, and/or the fault isolation circuit 158. The one or more memory devices and processor(s) may have the same definition as provided below with respect to the memory 154 and the processor 152. Thus, in this hardware unit configuration, the sensor/OBD monitor circuit 155, the communications circuit 156, the fault detection circuit 157, and/or the fault isolation circuit 158 may be geographically dispersed throughout separate locations in the vehicle 20 (e.g., separate control units, etc.). Alternatively and as shown, the sensor/OBD monitor circuit 155, the communications circuit 156, the fault detection circuit 157, and/or the fault isolation circuit 158 may be embodied in or within a single unit/housing, which is shown as the vehicle controller 150.

In the example shown, the vehicle controller 150 includes the processing circuit 151 having the processor 152 and the memory 154. The processing circuit 151 may be structured or configured to execute or implement the instructions, commands, and/or control processes described herein with respect to the sensor/OBD monitor circuit 155, the communications circuit 156, the fault detection circuit 157, and/or the fault isolation circuit 158. Thus, the depicted configuration represents the aforementioned arrangement where the sensor/OBD monitor circuit 155, the communications circuit 156, the fault detection circuit 157, and/or the fault isolation circuit 158 are embodied as machine or computer-readable media. However, as mentioned above, this illustration is not meant to be limiting as the present disclosure contemplates other embodiments such as the aforementioned embodiment where the sensor/OBD monitor circuit 155, the communications circuit 156, the fault detection circuit 157, and/or the fault isolation circuit 158, or at least one circuit of the sensor/OBD monitor circuit 155, the communications circuit 156, the fault detection circuit 157, and/or the fault isolation circuit 158, are configured as a hardware unit. All such combinations and variations are intended to fall within the scope of the present disclosure.

The processor 152 may be implemented as one or more processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the sensor/OBD monitor circuit 155, the communications circuit 156, the fault detection circuit 157, and/or the fault isolation circuit 158 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 154 (e.g., RAM, ROM, Flash Memory, hard disk storage, etc.) may store data and/or computer code for facilitating the various processes described herein. The memory 154 may be communicably connected to the processor 152 to provide computer code or instructions to the processor 152 for executing at least some of the processes described herein. Moreover, the memory 154 may be or include tangible, non-transient volatile memory or non-volatile memory. Accordingly, the memory 154 may include database components, object code components, script components, or any other type of information structure for supporting the various activities and information structures described herein.

The communications interface 153 may include any number and type of wired or wireless interfaces (e.g., jacks, antennas, transmitters, receivers, transceivers, wire terminals, etc.) for conducting data communications with various systems, devices, or networks. For example, the communications interface 153 may include an Ethernet card and port for sending and receiving data via an Ethernet-based communications network and/or a Wi-Fi transceiver for communicating via a wireless communications network. The communications interface 153 may be structured to communicate via local area networks or wide area networks (e.g., the Internet, etc.) and may use a variety of communications protocols (e.g., IP, LON, Bluetooth, ZigBee, radio, cellular, near field communication, etc.).

The communications interface 153 of the vehicle controller 150 may facilitate communication between and among the vehicle controller 150, one or more components of the vehicle 20 (e.g., components of the powertrain 100, components of the powertrain 110, components of the powertrain 115, components of the powertrain 118, the vehicle subsystems 120, the operator I/O device 130, the sensors 140, etc.), the service tool 300, and/or the server 400. Communication between and among the vehicle controller 150, the components of the vehicle 20, the service tool 300, and/or the server 400 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

In some embodiments, the sensor/OBD monitor circuit 155 is structured to receive or acquire, and store the operation data from the sensors 140 regarding operating characteristics or parameters regarding operation of one or more systems, subsystems, and/or components of the vehicle 20. In some embodiments, the sensor/OBD monitor circuit 155 is additionally or alternatively structured to receive or acquire, and store the OBD capability from the OBD monitors 142.

The communications circuit 156 is structured to facilitate controlling communication between (i) the vehicle controller 150 and (ii) the operator I/O device 130, the sensors 140, the OBD monitors 142, the service tool 300, and/or the server 400 via the communications interface 153. By way of example, the communications circuit 156 may be structured to acquire the operation data from the sensors 140. By way of another example, the communications circuit 156 may be structured to acquire the OBD capability data from the OBD monitors 142. By way of another example, the communications circuit 156 may be structured to provide an indication of or an alert regarding a fault detection and the isolated system, subsystem, and/or component responsible for the fault to the operator I/O device 130, the service tool 300, and/or the server 400 (e.g., such that an operator, a service technician, a fleet manager, etc. can be informed of the fault and take appropriate action). By way of yet another example, the communications circuit 156 may be structured to provide the operation data and/or the OBD capability data to the service tool 300 such that the service tool 300 may perform the fault detection and fault isolation functions and/or processes described herein. By way of still another example, the communications circuit 156 may be structured to provide the operation data and/or the OBD capability data to the server 400 such that the server 400 may perform the fault detection and fault isolation functions and/or processes described herein. By way of still yet another example, the communications circuit 156 may be structured to acquire operation data and/or OBD capability data from the service tool 300 and/or the server 400 regarding other vehicles associated with the vehicle 20 (e.g., vehicles owned by the same person or entity, vehicles in the same fleet, vehicles of a similar make and/or model, etc.).

In one embodiment, the fault detection circuit 157 is structured to acquire the operation data from the sensors 140 and perform the functions of the OBD monitors 142 described herein to identify faulty and healthy vehicle subsystems 120 throughout the vehicle 20 (e.g., determine the OBD capability data from the operation data and determine if a fault is present based on a comparison of the OBD capability data relative to fault thresholds). In another embodiment, the fault detection circuit 157 is structured to acquire the OBD capability data from the OBD monitors 142 and determine if a fault is present based on a comparison of the OBD capability data relative to fault thresholds to identify faulty and healthy vehicle subsystems 120 throughout the vehicle 20. In still another embodiment, the fault detection circuit 157 is structured to receive healthy or faulty signals from each of the OBD monitors 142 to identify faulty and healthy vehicle subsystems 120 throughout the vehicle 20.

The fault isolation circuit 158 is structured to implement one or more processes that analyze the operating data acquired from the sensors 140 and/or the OBD capability data acquired from the OBD monitors 142 when a fault is detected to drill down on the fault to not only identify the vehicle subsystem 120 experiencing the fault, but isolate or identify, with relative certainty, the component or components within the vehicle subsystem 120 that are the root cause of the fault. Such isolation ability provides significant diagnostic improvements in terms of efficiency, accuracy, and ease of service as compared to traditional diagnostics processes performed today. Specifically, fault diagnostics today typically start with a broad, system-level fault code. However, one of many parts of a system may be the cause of the fault. Therefore, when the vehicle with the fault is brought in for repair, technicians require specialized fault diagnostics equipment and, in some instances, significant time and trial and error to actually identify the cause of the fault using the specialized fault diagnostic equipment, which is time consuming, inefficient, and expensive. The fault isolation circuit 158 of the present disclosure can, therefore, mitigate the various disadvantages of the typical diagnostics procedures by directing technicians to the specific location and component that is likely the root cause of the fault, which increases repair speeds, decreases costs, and gets drivers back on the road with minimal downtime.

In some embodiments, the fault isolation circuit 158 may be structured to provide advanced warning or an alert regarding the faulty component or system, via the communications circuit 156, to facilitate taking advanced action prior to the vehicle with the faulty component arriving at a service bay to further improve repair time and reduce down time. As an example, the fault isolation circuit 158 may be structured to identify a faulty component and automatically order a replacement part to be shipped to a service location in advance of the arrival of the vehicle. As another example, the fault isolation circuit 158 may be structured to identify a faulty component and provide an alert to the operator, fleet manager, etc. to order a replacement part. As still another example, the fault isolation circuit 158 may be structured to provide an advance alert to the service location indicating the service/repair that is needed and providing a training video or other training guide for the necessary repair so that the assigned technician is up to speed and ready to start immediately upon arrival of the vehicle at the service location. As yet another example, the fault isolation circuit 158 may be structured to provide an advanced alert to a service location such that the service location makes sure that it has a service bay, necessary tools, and/or necessary staff available when the vehicle arrives and to perform the specific repair, maintenance, or replacement.

Figure 7:
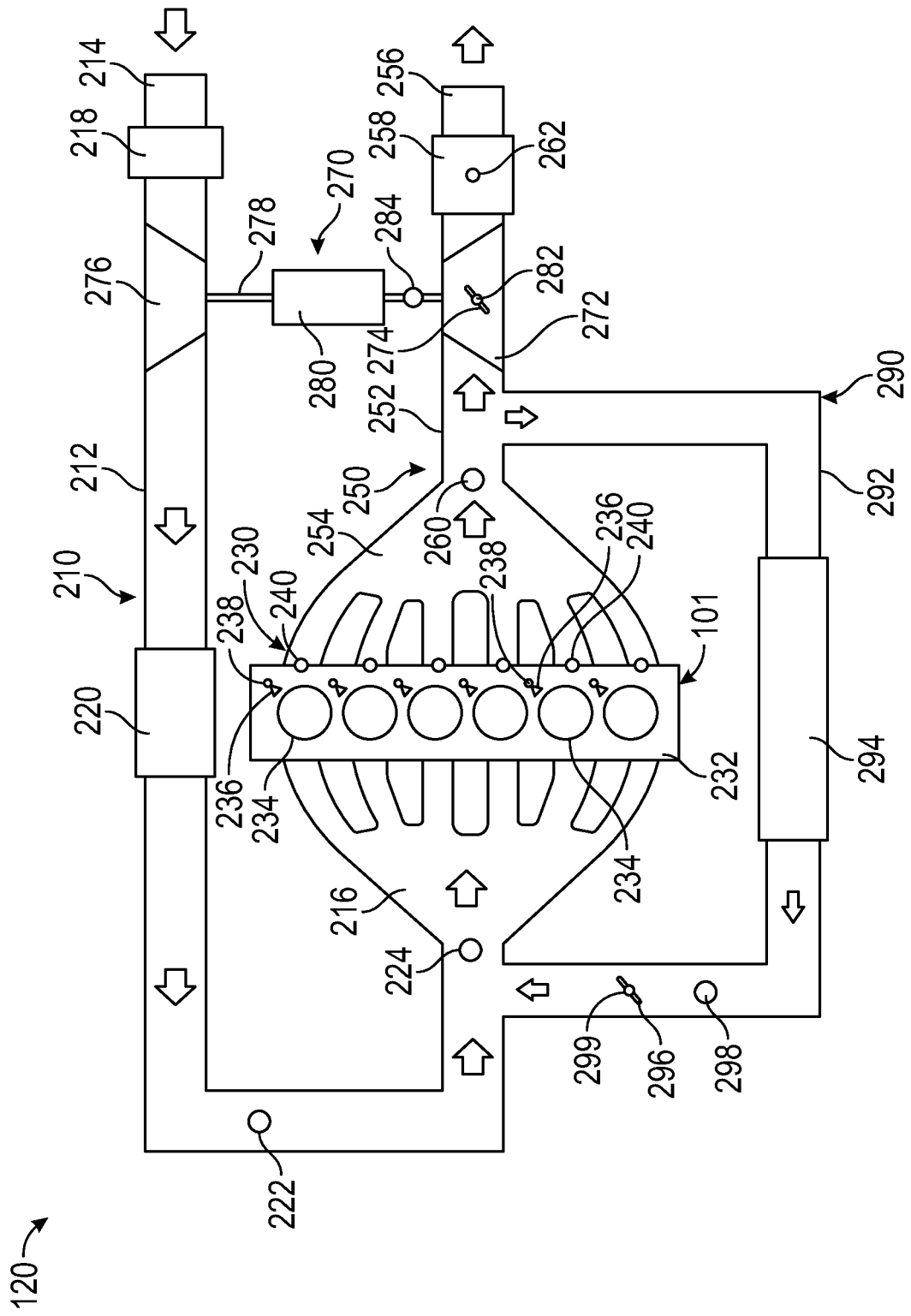
FIG. 7 is a schematic diagram of a vehicle subsystem, according to an example embodiment.
Figure 8A:
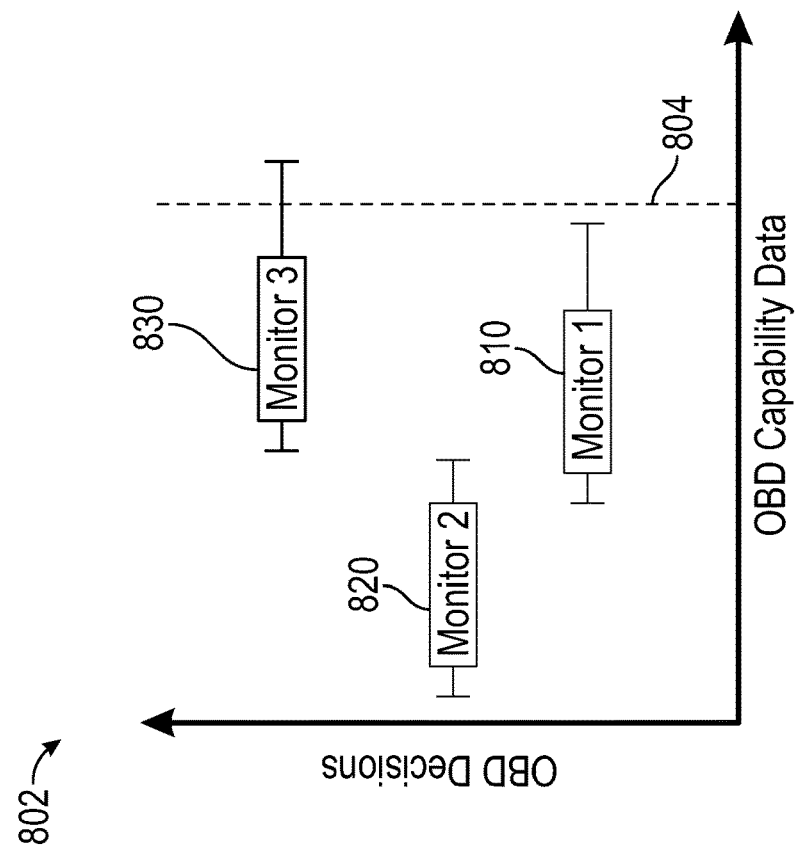
FIG. 8A is a graphical representation of a first failure mode identified using a multiple OBD monitor monitoring process, according to an example embodiment.
Figure 8B:
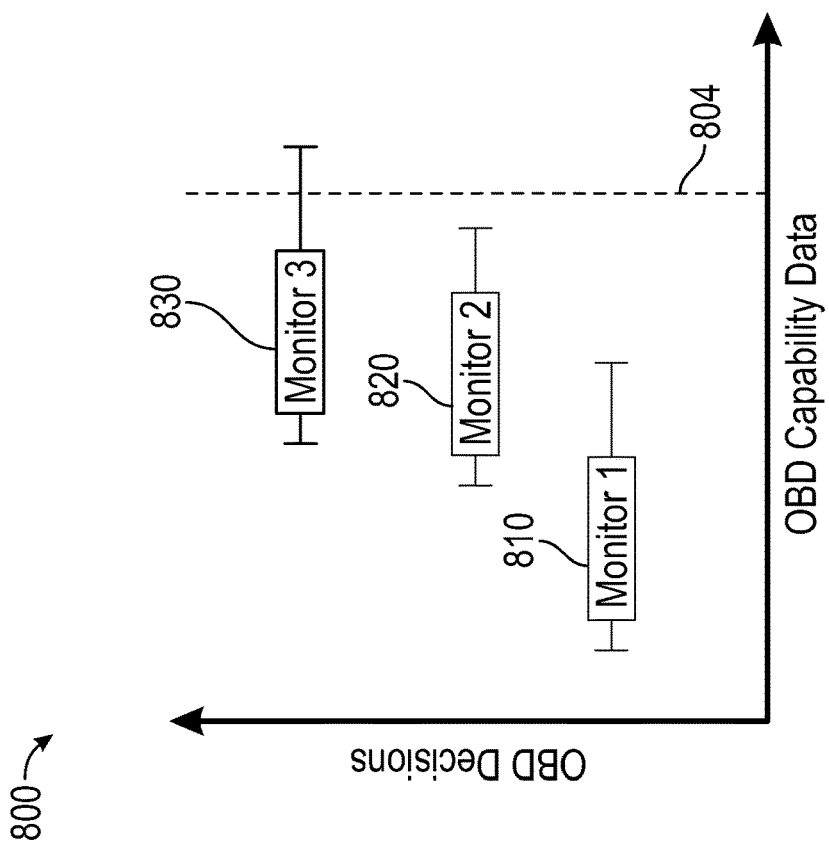
FIG. 8B is a graphical representation of a second failure mode identified using the multiple OBD monitor monitoring process, according to an example embodiment.
Figure 9:
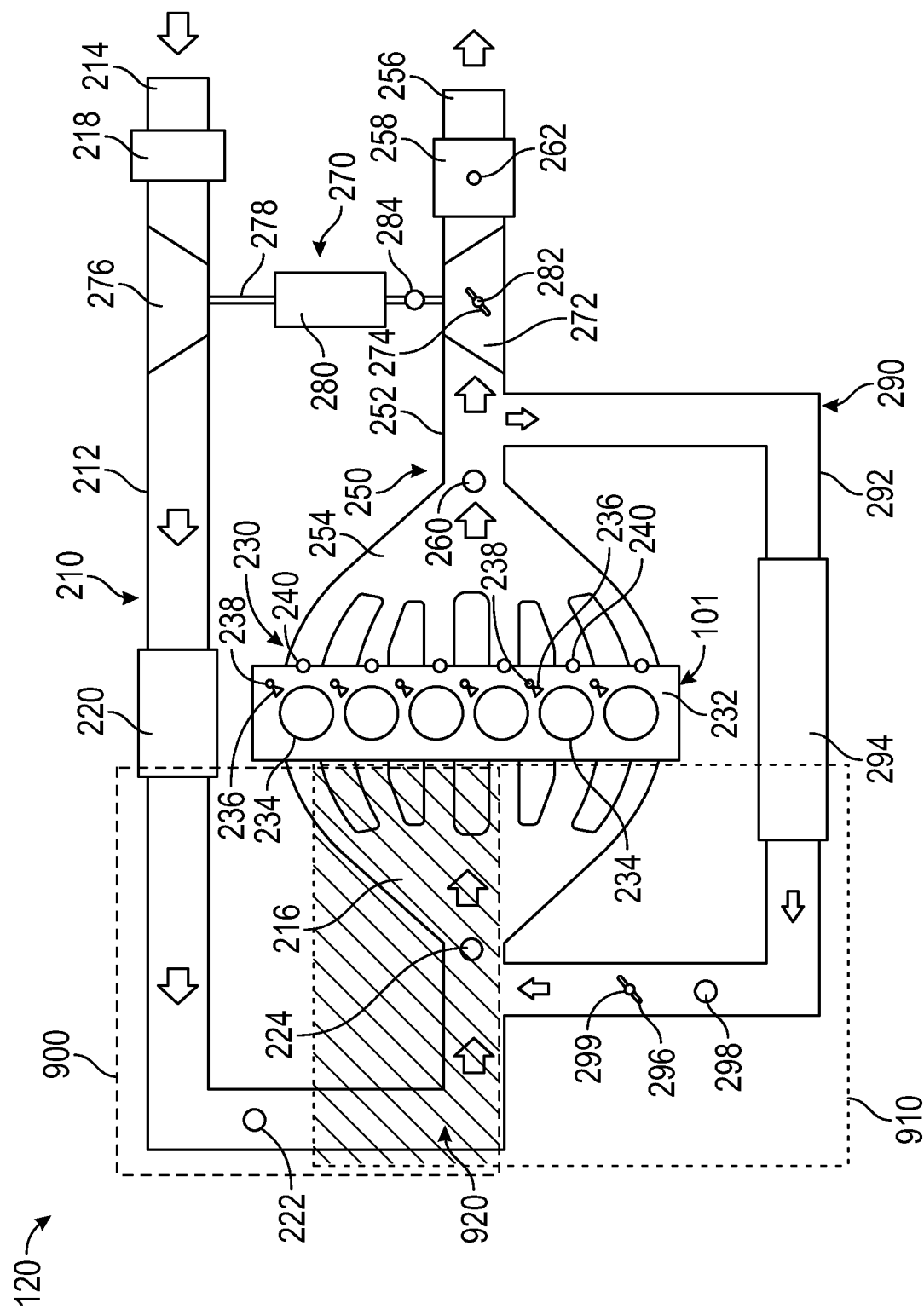
FIG. 9 is a schematic diagram of diagnosing faulty components or faulty portions of a vehicle subsystem using a control volumes analysis process, according to an example embodiment.

The one or more processes implemented by the fault isolation circuit 158 include (i) a trending model process, (ii) a multiple OBD monitor monitoring process, and/or (iii) a control volumes analysis process, each of which is described in greater detail herein with respect to FIGS. 7-9. Specifically, each of these three processes will be described with respect to the vehicle subsystems 120 of the vehicle 20 shown in FIG. 7. However, it should be understood that that the vehicle subsystems 120 shown in FIG. 7 are just one possible example of subsystems with which the processes implemented by the fault isolation circuit 158 can be applied.

As shown in FIG. 7, the vehicle subsystems 120 of the vehicle 20 includes a first subsystem or an air handling system 210, a second subsystem or an engine system 230, a third subsystem or an exhaust system 250, a fourth subsystem or variable geometry turbo (VGT) 270, and a fifth subsystem or EGR system 290. The air handling system 210 includes an intake conduit 212 having (i) an air intake 214 and (ii) an intake manifold 216, an air filter 218 positioned proximate the air intake 214, and an intercooler 220 positioned along the intake conduit 212 between the air intake 214 and the intake manifold 216. The air handling system 210 also includes various sensors 140 including (i) an intake mass airflow (MAF) sensor 222 positioned to monitor the amount of air entering the engine system 230 and (ii) a manifold absolute pressure (MAP) sensor 224 positioned to monitor the pressure of the air entering the engine system 230 via the intake manifold 216. The intake MAF sensor 222 may also include an intake air temperature (IAT) sensor integrated therewith that is positioned to monitor the temperature of the air entering the engine system 230. The air handling system 210 may include additional or different components and/or sensors, the components shown are for example purposes only.

The engine system 230 includes the engine 101 having various components including a cylinder block 232 having a plurality of cylinders 234 and a plurality of fuel injectors 236, one of which is associated with a respective one of the plurality of cylinders 234. The plurality of cylinders 234 receive air from the air handling system 210 through the intake manifold 216 where the air is combined with fuel injected therein by the fuel injectors 236 to facilitate combustion. The engine system 230 also includes various sensors 140 including injector sensors 238 positioned to monitor the pressure of the fuel entering the fuel injectors 236 and air fuel ratio sensors 240 positioned to monitor oxygen content within the exhaust exiting the cylinders 234 into the exhaust system 250.

The exhaust system 250 includes an exhaust conduit 252 having (i) an exhaust manifold 254 and (ii) an exhaust outlet 256, and an exhaust aftertreatment system 258 positioned along the exhaust conduit 252 downstream of the exhaust manifold 254. The exhaust aftertreatment system 258 may include various components used to reduce exhaust emissions, such as a SCR catalyst, a DOC, a DPF, DEF doser with a supply of diesel exhaust fluid, and/or still other components. The exhaust system 250 also includes various sensors 140 including (i) a manifold sensor 260 positioned to monitor one or more characteristics (e.g., temperature; pressure; exhaust contents such as oxygen levels, NOx levels, etc.) of exhaust exiting the engine system 230 and (ii) one or more exhaust aftertreatment sensors 262 (e.g., an oxygen sensor, a NOx sensor, a temperature sensors, etc.) positioned to monitor one or more characteristics of the exhaust aftertreatment system 258 (e.g., temperature, oxygen levels, NOx levels, etc.). The exhaust system 250 may include additional or different components and/or sensors, the components shown are for example purposes only.

The VGT 270 includes a turbine 272 positioned along the exhaust conduit 252, a compressor 276 positioned along the intake conduit 212, a connecting shaft 278 extending between the turbine 272 and the compressor 276, and an electric turbo assist (ETA) 280 coupled to the connecting shaft 278. The turbine 272 has a first flow adjuster or turbine vane(s) 274 that facilitates controlling the flow of exhaust through the turbine 272 and, thereby, the speed at which the turbine 272 drives the other components of the VGT 270. The VGT 270 also includes various sensors 140 including (i) a vane sensor 282 positioned to monitor the position of the turbine vane(s) 274 and (ii) a shaft sensor 284 positioned to monitor a rotational speed of the connecting shaft 278. The VGT 270 may include additional or different components and/or sensors, the components shown are for example purposes only.

The EGR system 290 includes an EGR conduit 292 connecting the exhaust conduit 252 back to the intake conduit 212, a heat exchanger or EGR cooler 294 positioned along the EGR conduit 292, and a second flow adjuster or EGR valve 296 positioned along the EGR conduit 292 to facilitate controlling the flow of exhaust that is recirculated from the exhaust system 250 to the air handling system 210 by the EGR system 290. The EGR system 290 also includes various sensors 140 including (i) an EGR MAF sensor 298 positioned to monitor the amount of exhaust flowing through the EGR conduit 292 into the air handling system 210 and (ii) a valve sensor 299 positioned to monitor the position of the EGR valve 296. The EGR MAF sensor 298 may also include a temperature sensor integrated therewith that is positioned to monitor the temperature of the exhaust exiting the EGR system 290. The EGR system 290 may include additional or different components and/or sensors, the components shown are for example purposes only.

Trending Model Process

The fault isolation circuit 158 may be structured to implement the trending model process by (i) acquiring data (e.g., from the sensors 140, etc.) regarding system, subsystem, and/or component operating parameters, (ii) monitoring the operating parameters over time, and (iii) comparing the operating parameters to (a) nominal operating parameters from when the system, subsystem, and/or component was new, (b) current operating parameters of the same or similar systems, subsystems, and/or components within the vehicle 20, and/or (c) operating parameters of the same or similar systems, subsystems, and/or components of other vehicles (e.g., within the same fleet of the vehicle 20, of a similar make/model, etc.). The fault isolation circuit 158 may then be structured to provide alerts as the system, subsystem, and/or the component is trending towards its functional limits. Advantageously, the trending model process facilitates examining the operating parameters specific to a particular component over time and relative to healthy operating parameters (of the particular component, of other similar components in the same vehicle, or of similar components in other vehicles) and, if deviations are detected, technicians know which specific component to investigate. Technicians can thereby decrease diagnostic time and increase the velocity of the repair, getting customers back in operation faster. Shorter repair times increase both engine uptime and customer satisfaction. Truck drivers and owners benefit, as well. With a more precise understanding of the cause, truck drivers and owners can make better business decisions by enabling them to decide whether to wait for the repair, to continue on with the current vehicle, or to call for another vehicle to complete the mission.

As an example, the fault isolation circuit 158 may be structured to acquire data from the injector sensors 238 and/or the air fuel ratio sensors 240 indicative of operating parameters of the each of the fuel injectors 236. The fault isolation circuit 158 may be structured to monitor the operating parameters of each of the fuel injectors 236 over the operational life thereof. In some embodiments, when the current operating parameters of a respective fuel injector 236 begin to deviate from the nominal or new operating parameters of the respective fuel injector 236 by more than a threshold amount, the fault isolation circuit 158 is structured to provide an alert indicating that the respective fuel injector 236 may be drifting and require maintenance or replacement. In some embodiments, the fault isolation circuit 158 is structured to additionally or alternatively compare the current operating parameters of the respective fuel injector 236 to the other fuel injectors 236 to identify or confirm that the respective fuel injector 236 may be drifting and require maintenance or replacement (e.g., if the current operating parameters of the respective fuel injector 236 deviates from the current operating parameters of the other fuel injectors 236 by more than a threshold amount, etc.).

As another example, the fault isolation circuit 158 may be structured to acquire data from the exhaust aftertreatment sensors 262 indicative of operating parameters of components of the exhaust aftertreatment system 258, for example an SCR unit. The fault isolation circuit 158 may be structured to monitor the operating parameters of the SCR unit over the operational life thereof. In some embodiments, when the current operating parameters of the SCR unit begin to deviate from the nominal or new operating parameters of the SCR unit, the fault isolation circuit 158 is structured to provide an alert indicating that the SCR unit may be failing and require maintenance or replacement. In some embodiments, the fault isolation circuit 158 is structured to additionally or alternatively compare the current operating parameters of the SCR unit of the vehicle 20 to operating parameters of other SCR units of other vehicles to identify or confirm that the SCR unit of the vehicle 20 may be failing and require maintenance or replacement (e.g., if the current operating parameters of the SCR unit of the vehicle 20 deviates from the operating parameters of other SCR units of other vehicles by more than a threshold amount, etc.). By way of example, the vehicle controller 150 of the vehicle 20 may be connected to the server 400 via the network 30 and receive the operating parameters of other vehicles from the server 400 (e.g., a telematics system, etc.). By way of another example, the vehicle controller 150 of the vehicle 20 may receive the operating parameters of other vehicles when connected to the service tool 300 when brought in for service.

Multiple OBD Monitor Monitoring Process

The fault isolation circuit 158 may be structured to implement the multiple OBD monitor monitoring process by (i) monitoring the OBD capability data acquired from multiple OBD monitors 142 associated with a respective system or a respective subsystem of the vehicle 20 (e.g., in response to a respective OBD monitor 142 identifying that a fault may be present in the respective system or the respective subsystem, etc.), (ii) comparing the OBD capability data from OBD monitors 142 that monitor a common component of the respective system or respective subsystem, and (iii) identifying the faulty subsystem or component of the subsystem through the comparison.

The downfall of traditional OBD diagnostics methods is that a system using traditional OBD diagnostics methods is incapable of identifying which specific component is actually causing the fault code because multiple performance parameters associated with multiple components/systems are monitored by each OBD monitor. The multiple OBD monitoring process of the present disclosure does not introduce new signals for on-board diagnostics, but, instead, introduces a supervisory algorithm that uses existing OBD algorithms. Because multiple OBD monitors may be impacted by failure modes, analyzing OBD capability data from multiple OBD monitors 142 that may be impacted can be used to isolate failures to specific subsystems or components. Accordingly, the multiple OBD monitoring process of the present disclosure includes monitoring the OBD capability data from multiple OBD monitors 142 that monitor connected systems to narrow down the list of possible failure modes that are triggered or that are close to triggering an OBD fault within the connected systems (e.g., the air handling system 210, the engine system 230, the exhaust system 250, the VGT 270, and the EGR system 290).

Graphical examples of the multiple OBD monitoring process implemented by the fault isolation circuit 158 are provided by FIGS. 8A and 8B. FIG. 8A shows as a graph 800 of a first failure mode and FIG. 8B shows a graph 802 of a second failure mode for a system or subsystem that is associated with three OBD monitors 142. The graph 800 and the graph 802 both include a normalized diagnostic threshold 804, first OBD capability data 810 acquired from a first OBD monitor 142, second OBD capability data 820 acquired from a second OBD monitor 142, and third OBD capability data 830 acquired from a third OBD monitor 142. The first OBD monitor 142 may monitor a first plurality of components (e.g., components A, B, and C) or a first portion of a system/subsystem and the second OBD monitor 142 may monitor a second plurality of components (e.g., components C, D, E) or a second portion of the system/subsystem where (i) at least one of the first plurality of components and at least one of the second plurality of components are the same or common component (e.g., component C) or (ii) the first portion and the second portion at least partially overlap. Similarly, the third OBD monitor 142 may monitor a third plurality of components (e.g., components B, E, F) or a third portion of the system/subsystem where (i) at least one of the first plurality of components and at least one of the third plurality of components are the same or common component (e.g., component B) or (ii) the first portion and the third portion at least partially overlap. Further, (i) at least one of the second plurality of components and at least one of the third plurality of components may be the same or common component (e.g., component E) or (ii) the second portion and the third portion may at least partially overlap. While data from three OBD monitors is shown, it should be understood that the multiple OBD monitoring process may be performed with systems or subsystems that are associated with more than three OBD monitors 142.

As shown in FIGS. 8A, the first failure mode is present where the third OBD capability data 830 indicates a value that is greater than the normalized diagnostic threshold 804 and the second OBD capability data 820 indicates a value that has not exceeded the normalized diagnostic threshold 804, but is greater than the value indicated by the first OBD capability data 810. The first failure mode, therefore, indicates that the faulty component or the faulty portion of the system/subsystem is (i) the same or common component between the third plurality of components and the second plurality of components (e.g., component E) or (ii) the overlap between the third portion of the system/subsystem and the second portion of the system/subsystem.

As shown in FIGS. 8B, the second failure mode is present where the third OBD capability data 830 indicates a value that is greater than the normalized diagnostic threshold 804 and the first OBD capability data 810 indicates a value that has not exceeded the normalized diagnostic threshold 804, but is greater than the value indicated by the second OBD capability data 820. The second failure mode, therefore, indicates that the faulty component or the faulty portion of the vehicle system/subsystem is (i) the same or common component between the third plurality of components and the first plurality of components (e.g., component B) or (ii) the overlap between the third portion of the system/subsystem and the first portion of the system/subsystem.

Control Volumes Analysis Process

The fault isolation circuit 158 may be structured to implement the control volumes analysis process using a fault isolation table (FIT) method. The FIT is a predefined table based on system architecture and, as described in more detail herein, provides a relationship matrix that defines control volumes across a vehicle system, which may be used to isolate faults. Generally, the FIT method includes: (i) gathering diagnostic information (e.g., cusums, etc.) from error accumulators or diagnostic estimators to generate an error diagnostic vector (e.g., a max diagnostic cusum error vector in a time window, etc.), (ii) applying auto-tuned nominal reference values in the form of a healthy diagnostic vector (e.g., a calibrated max healthy diagnostic cusum vector from a rich cycle, which is predetermined and prestored, etc.) to the error diagnostic vector (e.g., by dividing the error diagnostic vector by healthy diagnostic vector, etc.) to generate a ratio diagnostic vector (e.g., an error/cusum ratio vector, etc.), (iii) applying the ratio diagnostic vector to a relationship matrix defined by a calibrated FIT (e.g., by multiplying the ratio diagnostic vector and the relationship matrix, etc.) to provide a value for various possible failure modes, and (iv) sorting the values for the various possible failure modes to facilitate identifying the failure mode(s) with the highest likelihood of failing or that have already failed.

An example of a FIT associated with the vehicle subsystems 120 of FIG. 9 is provided below in Table 1. An example of a more comprehensive and detailed FIT may be found in the Appendix included herewith, which is incorporated herein by reference in its entirety. The FIT provides a relationship matrix that includes columns of diagnostic estimators and rows of failure modes. Each of the failure modes has either a value of 1 or a value of −1 for each diagnostic estimator. A value of 1 indicates that the respective failure mode is an input to a respective diagnostic estimator. A value of −1 indicates that the respective failure mode is not an input to the respective diagnostic estimator. The failure modes represent various different types of failures that can occur in a system such a sensor failures, actuator failures, and component failures such as ineffective operation as a result of flow leaks, flow restrictions, or damage. The diagnostic estimators define control volumes within the system associated with the FIT.

TABLE 1

| | | Diagnostic Estimators | | | | |
|---|---|---|---|---|---|---|
| | | Estimator 1 | Estimator 2 | Estimator 3 | Estimator 4 | ... Estimator n |
| Failure Modes | Mode 1 | 1 | −1 | −1 | −1 | −1 |
| | Mode 2 | 1 | −1 | 1 | −1 | −1 |
| | Mode 3 | 1 | 1 | 1 | −1 | −1 |
| | Mode 4 | 1 | 1 | 1 | −1 | −1 |
| | Mode 5 | −1 | 1 | 1 | −1 | −1 |
| | Mode 6 | −1 | 1 | 1 | −1 | −1 |
| | Mode 7 | −1 | 1 | −1 | 1 | −1 |
| | Mode 8 | −1 | 1 | −1 | 1 | 1 |
| | Mode 9 | −1 | 1 | −1 | 1 | 1 |
| | . | | | | | |
| | . | | | | | |
| | Mode n | −1 | −1 | −1 | 1 | 1 |

Applying the FIT of Table 1 to FIG. 9, failure mode 1 relates to a portion of the intake conduit 212 (e.g., the portion downstream of the intercooler 220), failure mode 2 relates to the intake MAF sensor 222, failure mode 3 relates to the MAP sensor 224, failure mode 4 relates to the intake manifold 216, failure mode 5 relates to the EGR valve 296, failure mode 6 relates to the valve sensor 299, failure mode 7 relates to the EGR MAF sensor 298, failure mode 8 relates to the EGR cooler 294, failure mode 9 relates to a portion of the EGR conduit 292 (e.g., the portion downstream of the EGR cooler 294), and so on for each possible failure mode of the vehicle subsystems 120 of FIG. 9. The diagnostic estimator 1 includes failure modes 1-4 and, therefore, defines a first control volume 900 that includes the intake conduit 212, the intake MAF sensor 222, the MAP sensor 224, and the intake manifold 216. The diagnostic estimator 2 includes failure modes 3-9 and, therefore, defines a second control volume 910 that includes the MAP sensor 224, the intake manifold 216, the EGR valve 296, the valve sensor 299, the EGR MAF sensor 298, the EGR cooler 294, and the EGR conduit 292. It should be understood that the diagnostic estimators outlined in this paragraph and in Table 1 are for example purposes only. Various other additional and/or different diagnostic estimators may be defined based on desired granularity, system complexity, and system arrangement.

As shown in FIG. 9, the first control volume 900 and the second control volume 910 partially overlap to define an overlapped region 920. Accordingly, through implementing the FIT method outlined above, if diagnostic estimator 1 and the diagnostic estimator 2 are drifted from nominal, then the failure can be isolated down to the intersection of the two control volumes, or overlapped region 920, which includes the MAP sensor 224 and the intake manifold 216. This can be similarly applied to all of the control volumes and overlapped portions thereof across the entire vehicle system. Accordingly, the FIT method is used to observe the intersection of controls volumes using a relationship matrix (a weighted matrix that shows the relationship between failure modes and diagnostic errors), which can help in narrowing down the list of failure modes. The FIT method looks for common inputs between the different diagnostics that are drifting from nominal to help in narrowing down the list of possible failure modes that a technician must troubleshoot.

Continuing on with the example of FIG. 9, the FIT method may be performed by the fault isolation circuit 158 as follows. First, the diagnostic information regarding the vehicle subsystems 120 is gathered and the error diagnostic vector is generated. Second, the error diagnostic vector is divided by a predetermined/prestored, healthy diagnostic vector to generate a ratio diagnostic vector. Third, the ratio diagnostic vector is multiplied with the FIT table to generate values for each of the failure modes, as shown in Table 2. Lastly, the values from Table 2 are sorted to rank the failure modes with the highest probability of failure, as shown in Table 3. Accordingly, applying the FIT method indicates that both diagnostic estimator 1 and diagnostic estimator 2 are drifting from nominal conditions and that the most likely reason for such drifting is either that the MAP sensor 224 is faulty or the intake manifold 216 is leaking, restricted, or otherwise damaged. Again, it should be understood that the values outlined in Tables 2 and 3 are for example purposes only and intended only to demonstrate the concept of the FIT method.

TABLE 2

| Failure Mode | Value |
|---|---|
| Mode 1 | 20 |
| Mode 2 | 5 |
| Mode 3 | 104 |
| Mode 4 | 85 |
| Mode 5 | 15 |
| Mode 6 | 25 |
| Mode 7 | 35 |
| Mode 8 | 10 |
| Mode 9 | 30 |

TABLE 3

| Failure Mode | Value | Rank |
|---|---|---|
| Mode 3 | 104 | 1 |
| Mode 4 | 85 | 2 |
| Mode 7 | 35 | 3 |
| Mode 9 | 30 | 4 |
| Mode 6 | 25 | 5 |
| Mode 1 | 20 | 6 |
| Mode 5 | 15 | 7 |
| Mode 8 | 10 | 8 |
| Mode 2 | 5 | 9 |

It should be understood that no claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 6 and 7, it should be understood that the vehicle controller 150 and/or the server 400 may include any number of circuits for completing the functions described herein. For example, the activities and functionalities of the various circuits may be combined in multiple circuits or as a single circuit. Additional circuits with additional functionality may also be included. Further, it should be understood that the vehicle controller 150 and/or the server 400 may further control other activity beyond the scope of the present disclosure.

As mentioned above and in one configuration, the "circuits" may be implemented in machine-readable medium for execution by various types of processors, such as the processor 152. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, it should be understood that the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

The invention claimed is:

1. A non-transitory computer-readable medium having computer-executable instructions encoded therein, the instructions, when executed by one or more processors, cause the one or more processors to perform operations comprising:
storing a fault isolation relationship data set of a plurality of diagnostic estimators and a plurality of failure modes, each of the plurality of failure modes represents a type of failure that can occur with (i) a sensor or (ii) a vehicle component of a vehicle system that is associated with the fault isolation relationship data set, each of the plurality of diagnostic estimators is associated with a respective subset of the plurality of failure modes, each respective subset defines a control space within the vehicle system that contains at least one of (i) one or more sensors or (ii) one or more vehicle components of the vehicle system, wherein each control space at least partially overlaps another control space to define a plurality of overlapped regions;
storing healthy diagnostic data regarding nominal operational parameters of the vehicle system when healthy;
acquiring diagnostic information regarding current operational parameters of the vehicle system;
generating error diagnostic data based on the diagnostic information;
generating a value for each of the plurality of failure modes based on the fault isolation relationship data set, the error diagnostic data, and the healthy diagnostic data; and
providing an alert to at least one of a display of a vehicle, a display of a service tool, or a server to facilitate identifying which of the plurality of failure modes are most likely to cause a fault within the vehicle system based on the value for each of the plurality of failure modes.

2. The non-transitory computer-readable medium of claim 1, wherein the type of failure for each of the plurality of failure modes includes a sensor failure, an actuator failure, or a static component failure.

3. The non-transitory computer-readable medium of claim 1, wherein the fault is likely caused by a respective component or a respective sensor positioned within a respective overlapped region of the plurality of overlapped regions that has control spaces associated therewith that are drifting from the nominal operational parameters associated with the control spaces of the respective overlapped region.

4. The non-transitory computer-readable medium of claim 1, wherein the instructions, when executed by the one or more processors, cause the one or more processors to perform operations further comprising sorting the plurality of failure modes based on the value for each of the plurality of failure modes to facilitate identifying which of the plurality of failure modes are most likely to cause the fault within the vehicle system.

5. The non-transitory computer-readable medium of claim 1, wherein the one or more processors are at least one of (i) positioned in the vehicle in a vehicle controller, (ii) positioned remote from the vehicle in the server, or (iii) positioned remote from the vehicle in a service tool.

6. The non-transitory computer-readable medium of claim 1, wherein the vehicle system includes at least three or more of an intake system, an engine system, an exhaust system, an exhaust gas recirculation system, or a variable geometry turbo system.

7. A non-transitory computer-readable medium having computer-executable instructions encoded therein, the instructions, when executed by one or more processors, cause the one or more processors to perform operations comprising:

acquiring diagnostic data from one or more devices of a vehicle, wherein the diagnostic data includes at least (i) first diagnostic data acquired by a first diagnostic sensor associated with a first plurality of components or a first portion of the vehicle, (ii) second diagnostic data acquired by a second diagnostic sensor associated with a second plurality of components or a second portion of the vehicle, and (iii) third diagnostic data acquired by a third diagnostic sensor associated with a third plurality of components or a third portion of the vehicle, wherein (i) the first plurality of components and the second plurality of components include a first common component or (ii) the first portion and the second portion at least partially overlap, and wherein (i) the first plurality of components and the third plurality of components include a second common component or (ii) the first portion and the third portion at least partially overlap;

comparing the first diagnostic data, the second diagnostic data, and the third diagnostic data to identify a faulty component or a faulty portion of a vehicle system based on the comparison; and providing an alert indicating the faulty component or the faulty portion of the vehicle to at least one of a display of the vehicle, a display of a service tool, or a server.

8. The non-transitory computer-readable medium of claim 7, wherein the faulty component or the faulty portion of the vehicle system is determined to be the first common component or the overlap between the first portion and the second portion in response to the first diagnostic data and the second diagnostic data each indicating a greater value than the third diagnostic data, and wherein the faulty component or the faulty portion of the vehicle system is determined to be the second common component or the overlap between the first portion and the third portion in response to the first diagnostic data and the third diagnostic data each indicating a greater value than the second diagnostic data.

9. The non-transitory computer-readable medium of claim 7, wherein i the second plurality of components and the third plurality of components include a third common component or (ii) the second portion and the third portion at least partially overlap.

10. The non-transitory computer-readable medium of claim 7, wherein the instructions, when executed by the one or more processors, cause the one or more processors to perform operations further comprising acquiring the diagnostic data from the one or more devices in response to at least one of the first diagnostic sensor, the second diagnostic sensor, or the third diagnostic sensor indicating that a fault is present.

11. The non-transitory computer-readable medium of claim 7, wherein the one or more devices of the vehicle include a vehicle controller.

12. The non-transitory computer-readable medium of claim 7, wherein the one or more devices of the vehicle include the first diagnostic sensor, the second diagnostic sensor, and the third diagnostic sensor.

13. The non-transitory computer-readable medium of claim 7, wherein the one or more processors are at least one of (i) positioned on the vehicle in a vehicle controller, (ii) positioned remote from the vehicle in the server, or (iii) positioned remote from the vehicle in the service tool.

14. A non-transitory computer-readable medium having computer-executable instructions encoded therein, the instructions, when executed by one or more processors, cause the one or more processors to perform operations comprising:

acquiring data from one or more devices of a vehicle regarding current operating parameters of at least one of a vehicle system of the vehicle or a component of the vehicle system;

comparing the current operating parameters of the at least one of the vehicle system or the component of the vehicle to
current operating parameters of at least one of a similar system or a similar component of one or more other vehicles; and providing an alert to at least one of a display of the vehicle, a display of a service tool, or a server in response to the comparison indicating that the at least one of the vehicle system or the component requires maintenance or replacement.

15. The non-transitory computer-readable medium of claim 14, wherein the one or more processors are at least one of (i) positioned on the vehicle in a vehicle controller, (ii) positioned remote from the vehicle in the server, or (iii) positioned remote from the vehicle in the service tool.

16. The non-transitory computer-readable medium of claim 14, wherein the instructions, when executed by the one or more processors, cause the one or more processors to perform operations further comprising:

comparing the current operating parameters of the at least one of the vehicle system or the component of the vehicle to nominal operating parameters from when at least one of the vehicle system or the component of the vehicle was new; and determining that the alert is required in response to the current operating parameters deviating from the nominal operating parameters by more than a first threshold amount.

17. The non-transitory computer-readable medium of claim 16, wherein the instructions, when executed by the one or more processors, cause the one or more processors to perform operations further comprising:

comparing the current operating parameters of the at least one of the vehicle system or the component of the vehicle to the current operating parameters of the at least one of the similar system or the similar component of the vehicle; and confirming that the alert is required in response to the current operating parameters of the at least one of the vehicle system or the component of the vehicle deviating from the current operating parameters of the at least one of the similar system or the similar component of the vehicle by more than a second threshold amount.

18. The non-transitory computer-readable medium of claim 16, wherein the instructions, when executed by the one or more processors, cause the one or more processors to perform operations further comprising:

confirming that the alert is required in response to the current operating parameters of the at least one of the vehicle system or the component of the vehicle deviating from the current operating parameters of the at least one of the similar system or the similar component of the one or more other vehicles by more than a second threshold amount.

19. The non-transitory computer-readable medium of claim 14, wherein the instructions, when executed by the one or more processors, cause the one or more processors to perform operations further comprising:

comparing the current operating parameters of the at least one of the vehicle system or the component of the vehicle to the current operating parameters of the at least one of the similar system or the similar component of the vehicle; and determining that the alert is required in response to the current operating parameters of the at least one of the vehicle system or the component of the vehicle deviating from the current operating parameters of the at least one of the similar system or the similar component of the vehicle by more than a threshold amount.

20. The non-transitory computer-readable medium of claim 14, wherein the instructions, when executed by the one or more processors, cause the one or more processors to perform operations further comprising:

determining that the alert is required in response to the current operating parameters of the at least one of the vehicle system or the component of the vehicle deviating from the operating parameters of the at least one of the similar system or the similar component of one or more other vehicles by more than a threshold amount.

* * * * *